May 6, 1958
N. R. GUNDERSON
2,833,506
SCALE
Filed Nov. 8, 1956
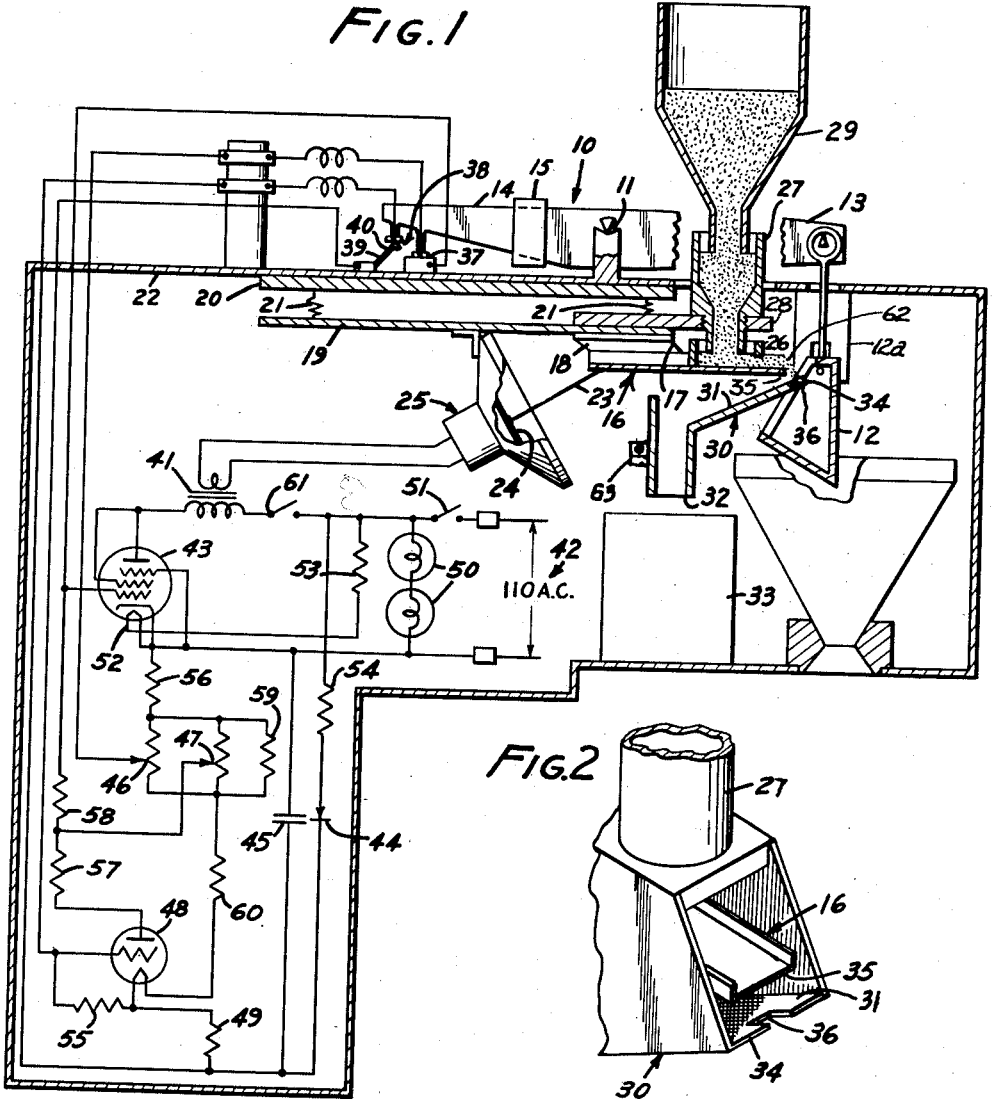
INVENTOR.
NORMAN R. GUNDERSON
BY
D. Gordon Angus
ATTORNEY.

United States Patent Office 2,833,506
Patented May 6, 1958

2,833,506
SCALE
Norman R. Gunderson, Pasadena, Calif.
Application November 8, 1956, Serial No. 621,167
11 Claims. (Cl. 249—42)

This invention relates to scales which are particularly adapted to the weighing of batches of granular materials.

An object of this invention is to provide a scale of simple construction for weighing out successive batches of granular material.

In the weighing out of some desired amounts of a granular material, it is theoretically possible to arrive at a substantially exact weight therefor, because the weight of a single granular particle is generally small compared to the weight of the desired sample. In practice, however, it is difficult to obtain samples of equal weight time after time because of the difficulty of cutting off the flow of granular material at the instant when the last desired particle of material is added to the sample. Adding granular material particle by particle to a sample at a uniform rate would give exact results, but would be inefficient due to the great length of time which such a process would take.

The invention is carried out by providing an electrically operated and controlled weighing device with which the granular material is added first at an initially fast rate to a sample to be scaled to a standard weight, and then at a second slower rate as the critical weight desired for the sample is approached.

A feature of the invention resides in an edge provided on a trough, which is disposed so that the main portion of the granular material being directed toward the standard weight container is allowed to pass over the trough edge to the container when flowing material is directed toward the container at a substantial rate of flow.

Another feature of the invention resides in a notch provided on the trough edge so that much of the granular material being directed toward the container is intercepted by the above trough edge, and only a part thereof passes through the notch when flowing material is directed toward the container at a lesser rate of flow, thereby adding particles to the sample in the container at a slower rate so that a more precise cut-off can be achieved.

An additional feature of the invention resides in the location of the said trough so that supply to the said container changes from a high rate of supply to a low rate of supply in a minimum time by means of the substantial interception of the stream of material by the trough as the result of a relatively small drop in the rate of flow.

These and other features will be fully understood from the following detailed description and the accompanying drawings, of which:

Fig. 1 is a side view, partly in cross section, and partly in schematic notation, of a device according to the invention;

Fig. 2 is a fragmentary perspective view of part of Fig. 1; and

Fig. 3 is an enlarged fragmentary cross section of part of Fig. 1 demonstrating three conditions of operation.

In Fig. 1, a weighing beam 10 (sometimes called a "scale beam" or a "balance beam") suspended on a fulcrum 11 has a weighing pan 12 suspended from one arm 13 and a sliding weight 15 on the other arm 14. A feeder 16 is suspended by means of inclined leaf springs 17 and 18. The leaf springs 17 and 18 are mounted on a plate 19. The plate 19 is suspended from a plate 20 by means of coil springs 21 in order to reduce the vibration transmitted from the plate 19 to a body 22 of the instrument. The feeder 16 is caused to vibrate by a stiff wire 23 connected between the feeder 16 and a voice coil 24 of a loud speaker 25. The wire 23 may be fastened to the voice coil 24 for example, by means of glue or the like. A pair of guides disposed one on each side of the weighing pan 12 lessen the sway thereof, and thereby reduce the tendency of the pan to deflect the weighing beam on account of horizontal forces which would swing the pan.

Mounted in feeder trough 16 is hopper 26 which has an opening at the bottom which allows a powdered material 62 contained in the hopper 26 to flow into feeder trough in the direction of the weighing pan 12. The powdered material 62 is fed into the hopper 26 from a funnel 27. The funnel 27 is supported by a support structure 28 which is mounted on the plate 19. The funnel 27 is fed by a funnel 29 mounted on the outside of the body 22 of the instrument by a supporting means not shown. The funnel 27 may be dispensed with by having funnel 29 feed directly into the hopper 26. However, such an arrangement transmits undesirable vibrations from the feeder 16 to the body 22 of the instrument.

The vibration of the funnel 27 is much less than the hopper 26 due to the small mass of the feeder 16 and the hopper 26 in comparison to the mass of the plate 19 and the speaker 25. Therefore by use of the funnel 27, the vibration transmitted to the body 22 of the instrument case through the funnel 29 is greatly reduced.

A trough 30 is provided which is located near both the feeder 16 and the weighing pan 12. The trough 30 has a bottom 31 disposed at an angle from the horizontal slanting downward and away from the weighing pan 12 to a position under the feeder 16. A lower edge 32 of the bottom 31 is located near an overflow bin 33 and an upper edge 34 is situated a small distance below, for example ³⁄₁₆ inches under the nearest edge of the bottom of the feeder 16. The upper edge 34 is also disposed a small distance, for example ³⁄₁₆ inch, away from a discharge edge 35 of feeder 16 in the direction which powdered material flows from the feeder 16 to the weighing pan 12.

In Fig. 2 there is shown in the upper edge 34 of the trough 30, a notch 36 in the trough bottom 31. The notch 36 is conveniently located centrally between the sides of the trough 30 and may be of a relatively small size, for example ³⁄₃₂ of an inch in width and extending back from the edge 34 for about ⅛ of an inch.

The trough 30 is ordinarily arranged so that it is mounted by a bracket 63 on the plate 19. A proper fixed spacing between the edge 34 of trough 30 and the discharge edge 35 of feeder 16 is thereby maintained. The above mounting method shown in Fig. 1, is the arrangement preferred for free flowing powders such as the various gun powders.

For powders which are not free flowing such as finely divided graphite or powdered sulfur, the trough 30 may be set at a steep angle and attached by the bracket 63 directly to the vibrating feeder 16. This arrangement would also maintain the proper spacing of parts. Also, the trough 30 and the vibrating wire 23 may be disposed so that they each are inclined at substantially the same angle and the vibrations of the trough 30 are then essentially in the plane of the trough. Vibration of the trough 30 keeps poorly-flowing powders from piling up in the trough. It is desirable for material which is caught by the trough to move to bin 33, and not remain on the trough. A pile of material in the trough might tend to overflow into the weighing pan.

Attached in part to, but electrically insulated from, the beam balance 10 and in part to, but electrically insulated from, the body 22 of the instrument case are electrical contacts 37 and 38. The contacts 37 and 38 open when the beam 10 tilts in a direction corresponding to an excess of weight in the weighing pan 12, which is an upward direction of the beam balance on the end having the electrical contacts 37 and 38. The contact 37 is an electrical contact comprised of two flat surface members having no appreciable flexibility which are directly facing one another when they are closed. This directly opposed arrangement causes the contact 37 to open upon only a few millionths of an inch movement of the beam 10. The contact 38 is comprised of a flat surface attached to but insulated from the beam 10 and a spring member 39 which is of a conductive flexible wire. The spring member 39 can be sufficiently stiff so any vibration period of the beam balance is kept very low, for example 1/20 or 1/30 of a second. Since the weight in the weighing pan 12 of amounts exerting as small as one grain of vertical force must keep the contact 38 closed, then vertical deflection is less than about 0.002 inch for a spring of the above stiffness. Due to such a small vertical deflection, the electrical contact would be difficult to keep in adjustment. This difficulty is overcome by making the spring member 39 for about one inch of its length at its upper end 40 of a different less stiff material, such as 0.020 inch Ney gold alloy wire. The flexible spring member 39 is inclined at an angle of about 45 degrees so that in flexing a rubbing action is produced on the surface of the contact 38 which is located on the beam 10. The arrangement of the parts of the contact 38 described above causes the contact 38 to open, only upon an appreciable movement of the beam 10.

The electronic circuit, shown in Fig. 1, operates the loudspeaker 25, which in turn operates the mechanical system by means of the vibrating wire 23 connected to the voice coil 24 of the speaker. A transformer 41 is connected electrically to the speaker 25. Regulated current to the transformer is provided by a 110 volt A. C. source 42 which is regulated by a power tube 43, such as a 50L6 power tube. Grid voltage of the power tube 43 is provided by a power supply means comprising a rectifier 44 and a condenser 45. A potentiometer 46 is provided to determine the grid voltage of the power tube 43 when the contact 37 is closed. When the contact 38 is closed and the contact 37 is open then the grid voltage of the power tube 43 is determined by a potentiometer 47 which is provided. A tube 48, which may conveniently be a 1U4, conducts when both the contacts 37 and 38 are open and provides output which supplies the grid of the tube 43 and causes the tube 43 to be biased negatively beyond cutoff. A resistance 49 in the grid circuit of the tube 48 is provided across which there is a voltage drop of about 20 volts when the contact 38 is closed.

The grid voltage cut off for the tube 48 is about 2 volts, thus when the contact 38 is closed there may be a voltage drop of almost 18 volts due to poor contact in the contact 38 before the grid bias of the power tube 43 is affected by the tube 48. Poor contact and a voltage drop between the elements of the contact 38 are present at the end of the weighing cycle due to extremely small contact pressures when the contact 38 is about to open. The above arrangement of electronic controls compensates for this difficulty since an 18 volt drop in contact 38 is required before the grid bias of the tube 43 is affected by the tube 48.

A number of illumination bulbs 50 for the instrument and a master switch 51 to the power supply 42 are also conveniently provided. A heater 52 which is integral with the tube 43 is provided, along with a resistance 53 in series with the heater. A resistance 54 is inserted in series with the rectifier 44 and a resistance 55 is in series with the resistance 49 and the grid of the tube 48 when the contact 38 is open. The cathode of the power tube 43 is provided with a resistance 56 between the power tube 43 and the potentiometers 46 and 47. A resistance 57 is provided between the output of the tube 48 and the potentiometer 47. The resistance 57 and a resistance 58 are both disposed in series between the output of the tube 48 and the potentiometer 46 when the contact 37 is closed. A resistance 59 is connected in parallel with the potentiometers 46 and 47 and a resistance 60 connects the potentiometers 46 and 47 and the resistance 59 to the heater of the tube 48.

A switch 61 is provided between the power supply 42 and the transformer 41, so that the transformer may be de-energized without opening the master switch 51.

Convenient selections of circuit elements are a 65 ma. selenium rectifier for 44, an 80 mfd., 150 volt capacitance for 45, a 2000 ohm potentiometer for 46 and a 2000 ohm potentiometer for 47. Resistances may have the following values, 440 ohms for 49, 500 ohms for 53, 22 ohms for 54, 1 megohm for 55, 220 ohms for 56, 0.5 megohm for 57, 0.5 megohm for 58, 330 ohms for 59 and 1750 ohms for 60.

In operation, the sliding weight 15 is set at a desired value on the beam 10 which may be provided with calibration marks. The contact 37 and 38 are both closed at the beginning of the operation when the weighing pan 12 is empty. Filling the weighing pan 12 first opens the contact 37 and then the contact 38 and the operation is completed, the weighing pan 12 having been filled to the predetermined weight.

The weighing pan 12 is filled in the following manner. Powdered material is placed in the funnel 29 either from a storage bin or from the overflow bin 33. The powdered material from the funnel 29 is fed into the funnel 27 and then to the hopper 26 where it is fed to the feeder 16.

The feeder 16 is vibrated by the attached wire 23 which runs to the moving voice coil 24 of the loudspeaker 25. The powdered material flows into the weighing pan 12 by clearing the edge 34 of the trough 30 due to velocity acquired by the particles as they flow down the inclined vibrating feeder 16. Particles that do not have sufficient velocity fall into the trough 30 and slide into the bin 33.

The voice coil 24 will vibrate the stiff wire 23 at a certain amplitude determined by the amount of current received by the transformer 41.

At the beginning of the operation both the contacts 37 and 38 are closed due to the unbalanced sliding weight 15 on the beam 10 which holds the left arm 14 of the beam down, and both of the contacts closed. With both contacts 37 and 38 closed the current to the grid of the power tube 43 is regulated by the potentiometer 46 and the current supplied to the transformer 41 determines the conditions of vibration of the stiff wire 23 and the feeder 16. The contact 37 is known as the high rate contact because with it closed, the feeder 16 is powered to give a high rate of feed of powdered material down the inclined feeder 16. The above high feed rate results because of the greater amplitude of vibration of the voice coil 24 when the contact 37 is closed and the greatest amount of current is thereby supplied to the transformer 41.

When the weighing pan 12 has received the greater part of the material which will balance the sliding weight 15, the high rate contact 37 opens quickly, since only a few millionths of an inch movement of the beam 10 will open the contact 37. The feeder 16 then vibrates at a smaller amplitude and a lower rate of feed because of the smaller current to the speaker transformer 41 when only the contact 38 closed, the contact 38 being known as the low rate contact. With the contact 38 closed and the contact 37 open the current to the grid of the power tube 43 is regulated by the potentiometer 47 and the smaller current now supplied to the transformer 41, as regulated by the tube 43, determines the smaller amplitude of vibration of the voice coil 24, the stiff wire 23 and the feeder 16.

When the weighing pan 12 has received the last desired particle necessary to balance the sliding weight 15, both of the contacts 37 and 38 are open, the power tube 48 conducts and causes the grid of the power tube 43 to be biased negatively beyond cutoff so that the tube 43 and the transformer 41 do not operate. The operation cycle is completed and no material is fed to the weighing pan 12 by the now motionless feeder 16. The cycle may be repeated by emptying the weighing pan 12 either by manual or mechanical means. With the weighing pan 12 empty, the contacts 37 and 38 are again both closed as they were at the beginning of the cycle due to the unbalanced weight 14 on the beam 10.

Details of the feeding operation as the material flows down the feeder 16 are best shown in Fig. 3. The action of the trough 30 when the vibrating feeder 16 is turned from a high rate, represented by the dotted line X in Fig. 3, to a low rate, represented by the dotted line Y in Fig. 3, is as follows. Particles having less than a certain horizontal velocity are prevented from falling into the weighing pan 12 and fall instead into the trough 30. If the feeder 16 is operated at the high rate and then suddenly stopped, the particles leaving the end 35 of the feeder 16 will at first have a horizontal velocity corresponding to the high rate. The horizontal velocity of the particles which still pass from the feeder 16 rapidly decreases until they reach a zero horizontal velocity. At some particular critical horizontal component of velocity, the particles no longer fall into the weighing pan 12 but fall into the trough 30. Without the trough 30 the particles would still fall into the weighing pan 12, thus the trough 30 cause rapid cutoff of material to the weighing pan.

The action of the trough on the low rate of feed of material, represented by the dotted line Y in Fig. 3, is as follows. Particles in the stream of materials Y hit the bottom 31 of the trough 30 near the upper edge 34 of the trough and then slide down the trough 30. A small proportion of particles in the stream Y pass through the notch 36 in the edge of the trough bottom 31 and fall into the weighing pan 12. In this manner, when on the low rate, a section of the vibrating feeder 16 equal to the width of the notch 36 in trough 30 is used to deliver material to the weighing pan. Because this section of the vibrating trough is very narrow there is little chance for several particles at once to pass through the slot.

In contrast, if trough 30 were removed and the vibrator voice coil 24 adjusted to feed material at the same rate into the weighing pan, then the adjustment of the vibrator would be critical because the velocity of the particles would be very nearly zero. Also, because of the comparatively large width of the feeder 16 a large number of particles can be situated along the edge 35 of the feeder 16. Several particles at a time could under such circumstances fall into the pan 12. Without the trough 30 the probability is much greater than with the trough 30 that several particles would fall into the weighing pan 12 immediately before the last particle was to be added to the weighing pan to bring it to a certain weight. With such addition of several particles instead of one, an excess weight would be obtained if the trough 30 were not used.

Material which does not reach sufficient velocity to clear either the edge 34 or the notch 36 in the trough 18 is represented by the dotted line labeled Z in Fig. 3. Some of the powdered material from the feeder 16 may dribble off as shown by dotted line Z, either at the high rate or low rate due to change of forward velocities by collision of particles or friction between particles and the side of the feeder 16, or other similar interferences or piling up of particles. This material in the stream Z, is deflected to the overflow bin 33 by the trough 30.

The time required for the powdered material to fall from the end of the feeder trough 4 into the weighing pan 2 is of the order of 0.1 second. This would seem to introduce a time lag into the system but does not because the force due to velocity of the material striking the weighing pan is approximately equal to the weight of the material which has been propelled free of the feeder 16 but has not yet landed in the weighing pan 12. When the flow of material is at a uniform rate and the particles are sufficiently small so that no appreciable discontinuities of force are produced, then the exactness of the weight delivered by the system is independent of the rate of feed providing the flow of material from the feeder 16 can be stopped instantly.

To understand better the nearly instantaneous interruption of material flow, the operation of the contacts 37 and 38 must be considered. The high rate contact 37 opens over a period of time of a few millionths of a second or without any appreciable time lag because there is no flexibility of contact members and the contact surfaces directly oppose one another face to face. The opening of the high rate contact 37 then operates the feeder 16 at the low rate. At the low rate, as a portion of the material in the stream Y of Fig. 3 is added to the weighing pan 12, the left arm 14 of balance beam 10 is pushed upward by the spring member 39 of the contact 38. The balance beam 10 reaches a uniform velocity resulting only from weight being added to the weighing pan 12 after a short time interval. After the uniform velocity is obtained, the position of the balance beam 10 at any instant corresponds to its equilibrium position and thus no undesired time lag results in the opening of the low rate contact 38 when that contact is ready to open.

A small but definite interval or time lag exists during the short interval when the balance beam 10 goes from its zero velocity at the beginning of the low rate period to the time when the uniform velocity mentioned above is reached. To reduce this time lag, hereafter called the velocity time lag, the effect of two construction details of the spring member 38 must be understood. First the spring member 39 is made sufficiently stiff so that the vibration period of the balance beam is very low, for example 1/20 or 1/30 of a second, as has already been mentioned. Secondly, the spring member 39 is inclined at an angle, for example at 45 degrees, so that in flexing a rubbing action of the spring member 39 against the other member of the contact 38 produces a dampening action on oscillations of the balance beam. The oscillation of the balance beam 10 is initiated by the change of velocity and this oscillation is rapidly damped out by the rubbing action. The pressure between members of the contact 38 is greatest and has the highest dampening effect when it is most needed at the beginning of the low rate cycle. The vibration of the balance beam 10 due to particles of powder striking the weighing pan 12 is also dampened by the spring member 39, since the spring member 39 exerts a force in opposition to the force of the material being weighed.

It should also be pointed out in the operation of the contacts 37 and 38 that undesirable chatter of contacts when they are near the point of opening is prevented by the reduction of vibration of the body 22. Vibration reduction is accomplished by providing spring mounts 21 on the supports for the vibrating feeder 16 and by providing two feeder funnels 27 and 29 as was previously described, one of which is attached to the outer side of body 22. Funnel 29 does not vibrate appreciably.

The novel material cutoff trough 30 of this invention provides a means by which the material flow of an electrically operated weighing device is accurately controlled. Rate of flow can be reduced substantially to addition of one particle at a time to the sample being weighed out. Time lags inherent in addition of weight to a balance type scale are eliminated or compensated for. The two rates of material feed provided by the cutoff trough of this invention permit rapid operation in the making of repeated scalings of a number of samples to a standard weight while still preserving accuracy of weight. Such accuracy was formerly obtainable only by much slower and more expensive means. The invention is also adaptable to the scaling of a wide variety of powdered material by slight changes in construction.

The invention provides a cut off trough disposed and arranged so as to permit passage of a trajectory of materials having a certain horizontal velocity while substantially blocking the greater part of the materials which flow in a trajectory having a slower horizontal velocity. Available selection of one of two different trajectories (which result from different particle velocities) provides a fast and a slow rate of material feed. With such an arrangement, a rapid-fill operation may be obtained for the greater part of the weighing cycle and a slow rate for great accuracy when the critical weight is about to be reached. Two trajectories of material are easily provided at different times by electronic control of the material feeder. The cutoff trough at the slower rate of feed permits passage of only a small portion of the slower horizontal velocity trajectory thereby allowing momentary additions to a sample weight as minute as one particle at a time. The cutoff trough intercepts unevenly fed and dribbling material, and such material and excess material intercepted during the slower rate of feed is conveniently removed to a storage bin by gravity since the cutoff trough is disposed at an inclined angle. The cutoff trough located in closed and fixed relationship with the trajectories also shortens the time necessary to change from one rate to another and also the time necessary to stop the slow feed rate completely, thus preventing overshooting of a desired standard weight of a sample being scaled.

The increase of speed of operation and accuracy of results is obtainable at only slight increased expense in the manufacture of an instrument, due to the simplicity of the novel features.

I do not desire that this invention be limited to the particular embodiment illustrated but only in accordance with the appended claims, since others skilled in the art may devise other forms which are still within the scope of the invention.

I claim:

1. A scale for weighing a predetermined quantity of granular material into a container, comprising: a scale beam having a pair of arms, a fulcrum mounting said beam between said arms, a shiftable weight on one of said arms, the container being suspended from the other of said arms, a feeder for discharging said material into the container, means for providing said material to the feeder, means for vibrating said feeder at a plurality of amplitudes, whereby material is dischargeable from said feeder at a plurality of speeds and in a plurality of trajectories corresponding to said speeds, a cutoff trough having an edge and a notch in said edge having a width less than that of the edge, said trough being so disposed and arranged that material discharged from the feeder at a relatively faster of said speeds clears the said edge and enters the container, and so that some material discharged at one of said lower speeds passes through said notch, whereby an initial portion of said quantity can be discharged from said feeder at a high rate of flow, and whereby at a lesser speed, only a relatively small portion of the material passes through the notch to the container, and whereby any dribble from said feeder lands on the said trough.

2. A scale for weighing a predetermined quantity of granular material into a container, comprising: a scale beam having a pair of arms, a fulcrum mounting said beam between said arms, a shiftable weight on one of said arms, the container being suspended from the other of said arms, a feeder for discharging said material into the container, means for providing said material to the feeder, means for vibrating said feeder at a plurality of amplitudes, whereby material is dischargeable from said feeder at a plurality of speeds and in a plurality of trajectories corresponding to said speeds, a cutoff trough having an edge and a notch in said edge having a width less than that of the edge, said trough being so disposed and arranged that material discharged from the feeder at a relatively faster of said speeds clears the said edge and enters the container, and so that some material discharged at one of said lower speeds passes through said notch, whereby an initial portion of said quantity can be discharged from said feeder at a high rate of flow, and whereby at a lesser speed, only a relatively small portion of the material passes through the notch to the container, and whereby any dribble from said feeder lands on the said trough; a control means for controlling the greater amplitudes of said vibrating feeder, and a second control means for controlling the lesser amplitudes of said vibrating feeder, said control means being so disposed and arranged with respect to the beam that they are selectively operated by movement of the beam for selection of the amplitude at which the feeder is to be vibrated.

3. Apparatus according to claim 2 in which said cutoff trough includes an inclined upper surface having said notched edge, said inclined upper surface being so disposed and arranged as to remove particles blocked by said cutoff trough by means of gravity, said particles sliding down said inclined surface.

4. Apparatus according to claim 2 in which said cutoff trough is of a greater width than said feeder and said notch in said cutoff trough is of a lesser width than said feeder.

5. Apparatus according to claim 2 in which the said control means for vibrating said feeder comprises a pair of switches, each switch being effective to change the amplitude of vibration at a selected position of said balance beam, the said selected beam position for one switch being different from the selected beam position for the other switch, said means for vibrating the feeder comprising a loudspeaker including a vibratable voice coil, a mechanical interconnection between said voice coil and said feeder, and means for actuating said voice coil at a plurality of amplitudes, said last-named means being controlled by said switches, whereby in one balance beam position, one of said switches causes the means for actuating said voice coil to actuate the same at a relatively high amplitude, and whereby in another position of said beam, the other of said switches causes said means to actuate the voice coil at a relatively lower amplitude, whereby in the former condition, material is discharged from the feeder at a relatively higher speed, and in the latter condition, material is discharged therefrom at a relatively lower speed.

6. Apparatus according to claim 5 in which said mechanical interconnection between said voice coil and said feeder comprises a stiff wire attached to said voice coil and attached to said feeder.

7. Apparatus according to claim 5 in which the switch which actuates said voice coil at a relatively higher amplitude comprises contact means partly disposed on said movable beam and partly disposed in a fixed position and the switch which actuates said voice coil at a relatively lower amplitude comprises contact means partly disposed on said movable beam and partly disposed in fixed position beam, said movable beam being movable about said fulcrum.

8. Apparatus according to claim 5 in which said means for actuating said voice coil at a plurality of amplitudes comprises an electric circuit having a power supply, a transformer for said loud speaker, a power tube so disposed and arranged in said circuit as to control current to said loud speaker transformer, potentiometer means so disposed and arranged in said circuit as to control output of said power tube, a second tube so disposed and arranged in said circuit as to bias said power tube negatively beyond cutoff when said beam of said scale reaches a predetermined position as it moves about said fulcrum, whereby said power tube when biased negatively beyond cutoff ceases to supply current to said transformer for said loud speaker.

9. Apparatus according to claim 5 in which the switch which actuates said voice coil at a relatively lower amplitude comprises a flexible contact means and a smooth surface contact means, one of said contact means being mounted to the beam, and the other being mounted to a fixed support, said contact means being so disposed and arranged relative to each other that in at least one position of said beam, the said flexible contact means rubs against said smooth surface contact means, thereby dampening any oscillations of said beam.

10. Apparatus according to claim 5 in which the switch which actuates said voice coil at a relatively lower amplitude comprises a flexible contact means having a portion of greater flexibility and a portion of lesser flexibility, and a smooth surface contact means, each so disposed and arranged relative to said beam that said flexible contact means deflects appreciably due to mechanical relationship of said movable beam in at least one position thereof, said smooth surface contact means being so disposed and arranged as to provide a rubbing surface for said flexible contact means.

11. Apparatus according to claim 10 in which the switch which actuates said voice coil at a relatively lower amplitude, and which has said flexible contact means is so disposed and arranged that said flexible contact means is disposed at an angle to the general direction of movement of the portion of said beam, said smooth surface contact means being attached to said beam so as to move therewith, whereby movement of said beam controls movement of said flexible contact means disposed at an angle to the beam movement.

References Cited in the file of this patent

UNITED STATES PATENTS

| | | |
|---|---|---|
| 2,587,531 | Saxe | Feb. 26, 1952 |
| 2,610,726 | Howard | Sept. 16, 1952 |
| 2,614,786 | Caron | Oct. 21, 1952 |
| 2,626,042 | Aldridge | Jan. 20, 1953 |
| 2,726,061 | Schieser | Dec. 6, 1955 |